United States Patent [19]
Hubbard et al.

[11] Patent Number: 4,714,185
[45] Date of Patent: Dec. 22, 1987

[54] PERFORATED WEB FEEDING APPARATUS

[75] Inventors: Leo J. Hubbard, Rio Grande, P.R.; Leo J. Kerivan, Somerset, Mass.

[73] Assignee: Precision Handling Devices, Inc., Fall River, Mass.

[21] Appl. No.: 763,155

[22] Filed: Aug. 7, 1985

[51] Int. Cl.[4] .................... G03B 1/22
[52] U.S. Cl. .................... 226/74
[58] Field of Search .................... 226/52, 57, 74, 75, 226/176, 171, 87; 400/616–616.3

[56] References Cited

U.S. PATENT DOCUMENTS

| | | | |
|---|---|---|---|
| 3,347,433 | 10/1967 | Bernard | 226/52 |
| 3,746,228 | 7/1973 | Arnold | 226/75 |
| 3,825,162 | 7/1974 | Hubbard | 226/74 |
| 4,129,239 | 12/1978 | Hubbard | 226/75 |
| 4,206,859 | 6/1980 | Plaza | 226/170 X |
| 4,421,261 | 12/1983 | Hubbard | 226/170 X |
| 4,469,263 | 9/1984 | Seitz | 226/75 X |

FOREIGN PATENT DOCUMENTS

| | | | |
|---|---|---|---|
| 65967 | 5/1979 | Japan | 226/52 |

*Primary Examiner*—Stuart S. Levy
*Assistant Examiner*—Lynn M. Sohacki
*Attorney, Agent, or Firm*—Martin LuKacher

[57] ABSTRACT

Apparatus for feeding perforated webs which has a form factor and cost which may be much less than conventional perforated paper feed mechanisms such as pinwheels and tractors, and in a preferred form is an elliptical path pin feed using an endless belt having pins which engage the perforations in the paper and a frame guides the belt over an elliptical path having major curved surfaces and minor curved surfaces along opposite sides and at the ends of the path, respectively. A sprocket journaled in the frame drives the belt. Guide members upstream and downstream of the web feed path and spaced from the opposite ends of one of the major surfaces guide the web so that it remains in contact with the belt along the major surface and enters and leaves the major surface along tangents thereto which are common to the major and minor end surfaces of the elliptical belt path. The elliptical pin feed provides a greater mechanical coupling than provided by the pins alone, because the guide members maintain the paper web along a path congruent and in contact with the entire arc of the major curved surface. The arc of wrap of the paper around the curved path of the belt, also called the wrap angle, may be selected in accordance with the coefficient of friction between the paper and belt surface to obtain the amount of mechanical drive coupling desired.

30 Claims, 11 Drawing Figures

PERFORATED WEB FEEDING APPARATUS

DESCRIPTION

The present invention relates to apparatus for feeding perforated webs, and particularly to a device which provides an elliptical path pin feed which may be implemented in a smaller space and at lower cost than conventional tractor or pinwheel feeds.

The invention is especially suitable for use in feeding perforated paper, such as computer forms in typewriters, printers and other perforated paper utilizing devices, either within such devices or a separate paper drive unit therefor.

In order to provide for accurate feeding of perforated paper, as is required for line registration in printers, especially when the paper is moved intermittently at high speed, the paper must be closely coupled to the drive mechanism. This generally requires engagement of several pins of the feeding device in the perforations of the paper. The requirement for engagement of several pins has heretofore dictated the form factor (space requirement) of the feeding device. This is because the the pitch (spacing distance) of the perforations in the paper is fixed. This fixes the diameter of the pinwheel and the length of the tractor.

The requirement for close mechanical coupling is contradictory to the requirement for a smooth and noninterfering release of the pins from the perforations in the paper. If the pins do not enter the perforations and leave the perforations without interference, the perforations may be torn which also degrades the feeding accuracy, both directly by allowing the paper to shift and slide and indirectly by changing the load on the drive motors and other elements of the paper drive system. Efforts to solve the contradictory problems of intimate mechanical coupling and noninterfering entry and release of the pins have led to the use of curved surfaces together with stripping devices for lifting the paper off the pins and leading the paper on to the pins. The stripping devices have been found to decrease the mechanical coupling. The result is that the devices are increased in length to provide more pins in engagement with more perforations (See U.S. Pat. No. 3,347,433 of Oct. 17, 1967 and U.S. Pat. Nos. 3,746,228 of July 17, 1973 and 4,421,261 of Dec. 20, 1973). Accordingly, the form factor of web feeding devices such as pinwheels and tractors has been greater than desired for many applications and the cost thereof, has necessarily been increased.

Accordingly, it is the principal object of the present invention to provide improved apparatus for feeding perforated webs such as perforated paper used for computer forms and the like, which may have a form factor smaller than devices for such purposes heretofore provided, such as pinwheels and tractors, and which may be implemented at low cost.

It is a further object of the present invention to provide an improved elliptical path pin feed for perforated webs, in which the arc of wrap of the web around the path of the belt (the wrap angle) may be selected with regard to the coefficient of friction between the web and the surface of the belt to provide for desired increase in mechanical drive coupling over and above the coupling provided by the pins.

It is a still further object of the present invention to provide an improved perforated web feeding mechanism which is capable of accurate feeding of perforated webs so as to provide for accurate line registration when the apparatus is used in printers and the like.

It is a still further object of the present invention to provide improved perforated web feeding apparatus using a belt with perforation engaging pins which may be reduced in cost by eliminating, or at least partially eliminating, a lid for maintaining the web on the belt.

It is a still further object of the invention to provide an improved web feeding mechanism having a belt with pins which are engageble with perforations in the web wherein additional driving forces to the forces provided by the pins are applied to the web by providing close frictional coupling between the surface of the belt and the web; the pins providing alignment and registration.

It is a still further object of the invention to provide an improved web feeding device for multi-layer webs, such as multi-part computer forms, and having a belt with pins engageble with perforations in the web over a curved path, and particularly an arc defined by a major radius of an elliptical path around which the belt travels, wherein misalignment of the layers due to the difference in length of arc over which the web is driven is compensated by means for pre-displacing the layers before arrival at the web feeding device.

Briefly described, apparatus for feeding webs which have perforations spaced from each other, which is provided in accordance with the invention, utilizes an endless belt having pins spaced from each other at a pitch equal to the spacing of the perforations in the web. The pins are engageble in the perforations during web feeding operations. The belt also has drive elements on the opposite side of the belt from the pins. A frame defines an elliptical path for the belt with opposite major curved surfaces about major radii; along one of which major surfaces a number of pins engage the perforations. A sprocket is journaled in the frame and is engageble with drive elements of the belt. Guide members are spaced upstream and downstream of the major curved surface where the paper is engaged with the pins. These guide members are opposed to minor curved surfaces defined by the minor radii of the elliptical path at the ends of the frame. The guide members engage the web and maintain it wrapped around the major curved surface in contact with the belt. The path of the web is along a tangent common to the major and minor curved surfaces both at the upstream and downstream ends of the apparatus. This arrangement enables pins of height and shape (e.g., involute from tip to base) dictated by the major radii, rather than the minor radii of the path to be used on the belt, the arrangement assuring close mechanical coupling between the belt and the perforations. The web is maintained in close mechanical coupling with the belt such that the amount of coupling is greater than provided by the engagement of the pins alone. More particularly, when the engagement of the web and belt extends over an arc (wrap angle) which is determined by the load presented by the paper and the coefficient of friction between the web and the belt, additional coupling is obtained in principal part (approx. 40%) from the coupling between the belt surface and the web; the pins providing indexing and registration without accumulating positioning errors (non-accumulating indexing). The pins can be made larger in base diameter with larger curvature (greater slope), preferrably involute, from tip to base, further enhancing entry and accuracy of web positioning even during high speed drive. Accordingly, and by way of example, the mechanical coupling equivalent to the engagement of six pins can be provided notwithstanding that only four pins are engaged in perforations in the web. The form factor of the apparatus is therefore minimized. The need for lids to confine the web is also minimized or eliminated. The lid function and/or the function of the guide members may be provided by using a guide member which is curved, such as rollers which have the additional advantage of reducing the load presented by a lid. Another significant advantage provided by a roller, adjacent the end of the belt where the web arrives (upstream of the web feed) is to provide an arc sufficient to predisplace the layers of a multi-layer web, such as a multipart computer form, so as to compensate for misalignment which occurs as the layers travel around the curved surface. Also, since the apparatus may be implemented from a minimum number of parts, it may be manufactured at low cost.

The foregoing and other objects, features and advantages of the invention, as well as presently preferred embodiments thereof, will become more apparent from a reading of the following description and connection with the accompanying drawings in which.

Figure 1:
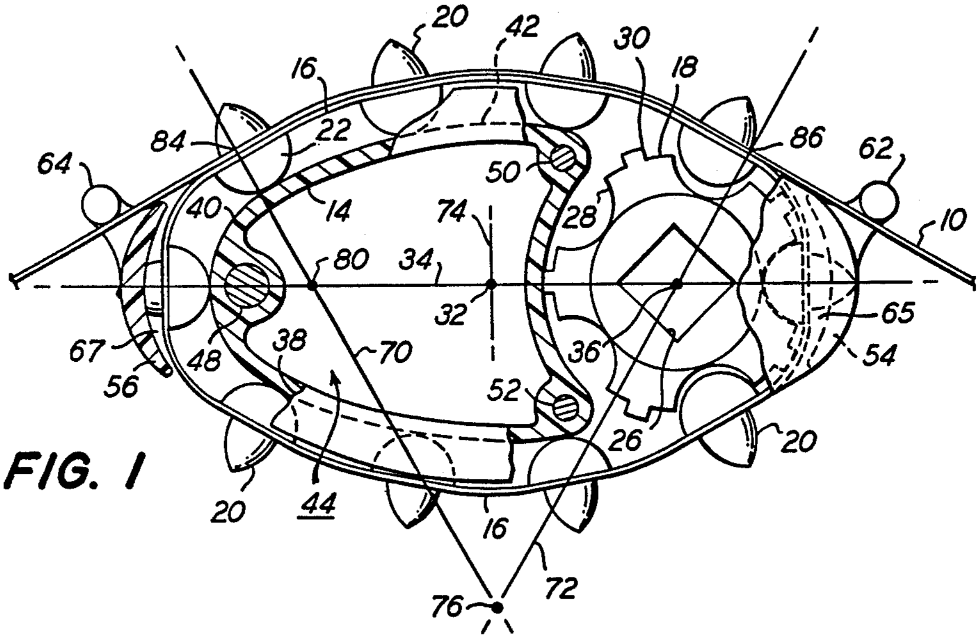
FIG. 1 is a front side view of an elliptical path pin feed provided in accordance with the invention, the side plate of the frame being broken away to illustrate the internal construction thereof.
Figure 2:
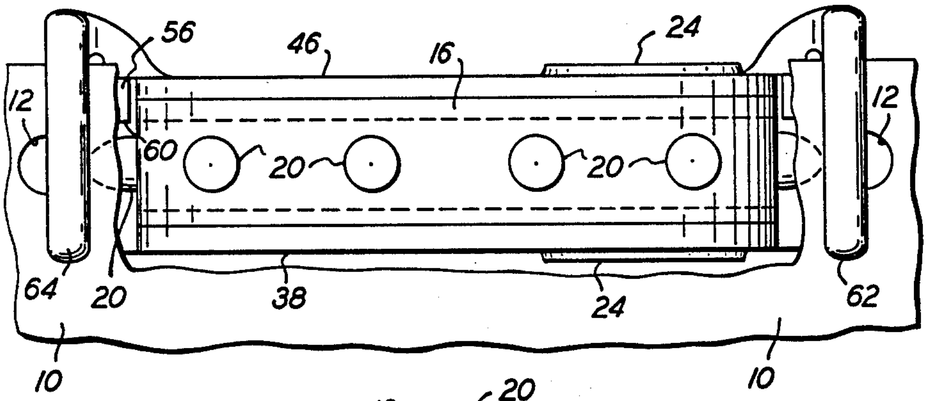
FIG. 2 is a plan view of the apparatus shown in FIG. 1 with parts broken away to better illustrate the construction.
Figure 3:
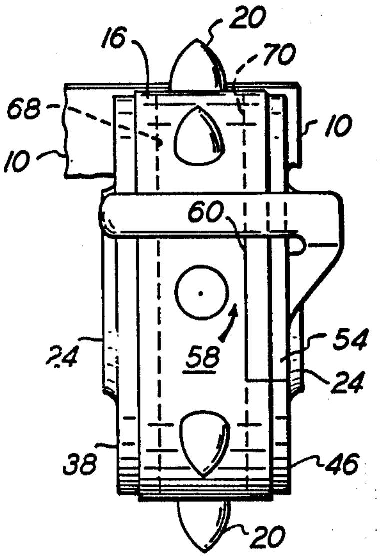
FIG. 3 is an end view of the apparatus shown in FIGS. 1 and 2.

Referring to FIGS. 1, 2 and 3 there is shown apparatus for feeding paper 10 having perforations 12 therein. This apparatus may be referred to as an elliptical path pin feed. The apparatus has a frame 14, an endless belt 16 and a sprocket 18. The endless belt has pins 20 and hemicylindrical drive elements 22 on opposite sides thereof. The design of the belt is described in U.S. Pat. No. 3,825,162. The pitch or spacing distance between the pins 20 is equal to the pitch or spacing distance of the perforations 12 in the paper 10.

The frame 14 has journals 24 in which the sprocket 18 is mounted. The sprocket has a drive shaft opening 26, recesses 28 for receiving the drive elements 22 of the belt, and projections 30 from the surface of the sprocket 30 from the surface of the sprocket between the recesses 28 which enhance the belt driving characteristics of the sprocket. Reference may be had to U.S. patent application Ser. No. 707,254 filed Mar. 1, 1985 in the name of Leo J. Kerivan, now U.S. Pat. No. 4,614,508, issued Sept. 30, 1986 for further information respecting the design of the sprocket 18. The sprocket is located on one side of the center 32 of the major axis 34 of the elliptical path with its axis of rotation 36 being the center of the minor radius which defines one of the minor, end surfaces of the elliptical path.

The elliptical path is defined by the frame 14. The frame has an inboard side member 38 from which there laterally projects a member 40 which defines the support surfaces 42 for the drive elements 22 on the element on the belt. This member 40 has a central opening 44 which extends laterally through the frame. This central opening is symmetrical about the major axis, but otherwise nonsymmetrical. It is heart-shaped in approximate outline and can receive a stud on the housing of the apparatus in which the elliptical path pin feed is used so as to hold and stabilize the pin feed in that apparatus. Alternatively a shoe containing a clamp, such as described in U.S. Pat. No. 4,129,239 may be used for supporting and locating the elliptical pin feed in the apparatus in which it is to be used.

The sprocket may have a flexible gripping like neck which provides clamping force to the drive shaft to position the tractor laterally in alignment with various widths of paper. The neck may be split or fluted and biased inwardly to provide requisite functional clamping force.

The frame 14 also has an outboard side plate 46 which may be assembled on the inboard side frame by pins and holes, some pins being on the inboard side plate and some on the outboard side plate 46. The pins in their holes are shown at 48, 50 and 52.

Figure 9:
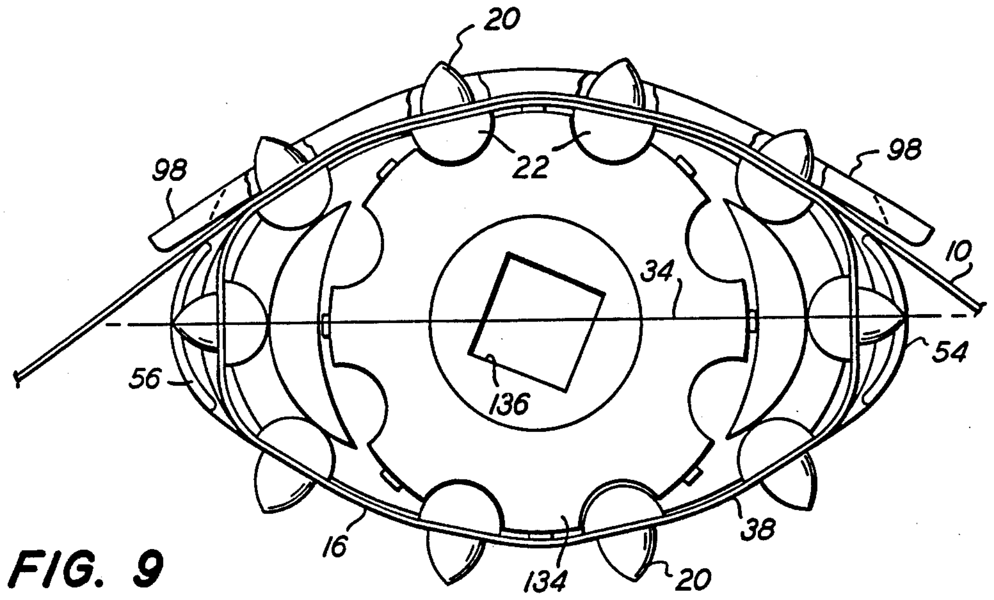
FIGS. 9 and 9A are front side and end views of web feed apparatus in accordance still another embodiment of the invention.
Figure 9A:
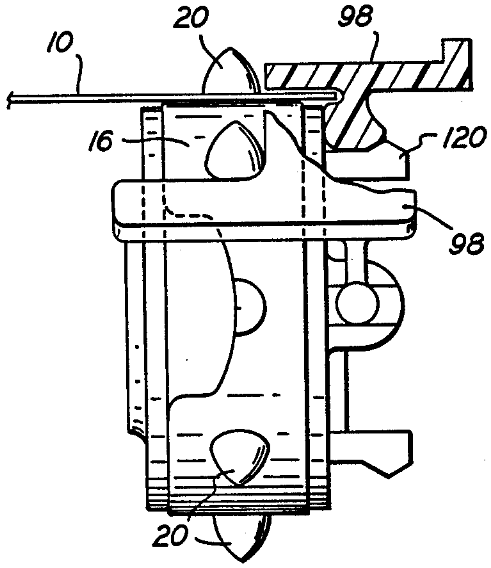

Located on the inboard side plate 38 of the frame 14 and projecting laterally inward are crescent-shaped shoe members 54 and 56. Similar shoe members may be provided on the outboard side plate. There shoe members may be L-shaped in cross-section as shown in FIGS. 9 and 9A. These shoe members are preferably molded as an integral part of their side frames. They extend laterally inward to a position which provides a clearance, as shown at 58 in FIG. 3 between the pins and the inside surface 60 of the shoe members 54 and 56.

Also, preferably molded integrally with the inboard side plates 38 are guide members 62 and 64. These members are cylindrical pins which have their axis parallel to the axis of rotation 36 of the sprocket and therefore lie perpendicular to the path of the belt 16 and the paper 10. There are gaps 65 and 67 between the inside concave surfaces of the shoe members 54 and 56 and the path of the belt around the surfaces defined by the minor radii of the elliptical path. With the outboard side plate 46 assembled on the inboard side plate 38, there is defined a guide path for the belt where it is supported vertically on the support surface 42 and horizontally between the walls of the inboard and outboard side plates 38 and 46. The lateral walls of the side plates which define the guide way are illustrated at 68 and 70 in FIG. 3. Reference may be had to U.S. Pat. No. 3,825,162 for further information respecting such guide path arrangements as are used in the herein described elliptical path pin feed.

The major curve surfaces of the elliptical path of the belt 16 are defined by the frame and are located opposite to each other. One of these surfaces, where the paper is engaged with the belt, is indicated between lines 70 and 72. The angle defined by these lines is bisected by the line 74, which is perpendicular to the major axis 34 and intersects it at its center 32. These lines 70 and 72 are each approximately 30 degrees from the line 74. The center of the arc of the major curved surface is indicated at 76. It will be noted that a pin wheel having the same number of pins in contact with the perforations in the paper would have a radius between the center 76 and the major surface twice this radius. The diameter of the pin wheel would be far larger than the length (along the major axis 34) of the elliptical path pin feed. In order to provide the same number of pins in engagement, a conventional tractor with linear path portions where the pins engage the perforations, would be longer than the elliptical path pin feed illustrated herein.

It will be appreciated that the curve of the major path opposite to that centered at 76, is the arc drawn about a center similar to the center 76 but on the opposite side of the structure. The centers of the minor curved surfaces are at the axis of rotation 36 of sprocket 18 which is where the line 72 intersects the major axis 34. The center of the opposite end surface is at the intersection 80 of the major axis 34 and the line 70. The major and minor curves have tangent points indicated at 84 and 86. There are of course symmetrical tangent points on the opposite side of the structure. The construction of the curved surfaces may follow the approximate four center ellipse method which is known in the art (See FIG. 171 on page 71 of the text, French's Engineering Drawing).

In order to provide close mechanical coupling and a amount of coupling which exceeds that provided by the engagement of the pins 20 alone, the paper is guided in a path along the common tangents to the minor end surfaces and the major curved surfaces of the elliptical path. This is accomplished by locating the guide members 62 and 64 upstream and downstream in the direction of paper feed and spaced from surfaces so that the paper 10 wraps around the entire arc of the major path curve, i.e., between the lines 70 and 72 and between the common tangent points 84 and 86. The guide members 62 and 64 are spaced from the shoes 54 and 56. The shoes have their outer curved surfaces which are also also along the common tangents. Accordingly, by placing the guides 62 and 64, as indicated, the paper will be guided along the common tangents both as it arrives (upstream) and as it leaves (downstream) the elliptical path pin feed.

The location of the paper path also enables the use of pins which are longer than the length dictated by the diameter of the sprocket 18, but rather dictated by the diameter of the major curved surfaces of the elliptical path. The pins enter and leave the perforations 12 in the paper without ticking or otherwise engaging the sides of the perforations until the perforations are fully seated on the pins. The longer pin length enables the use of a longer, higher slope involute shape to the pins which provides for close mechanical coupling of the paper on the surface of the belt.

It will be observed that the wrap between the common tangent points 84 and 86 occupies an arc or wrap angle of approximately 60° degrees, which is greater than one radian of the circumference of the circle of which the major surface of the elliptical path (along the arc between the tangent points 84 and 86) is a part. It can be shown that the mechanical coupling is increased by virtue of the wrap by a factor which is the base of natural logarithm to a power equal to the coefficient of friction and the angle of wrap. For example if $F_1$ is the frictional driving force applied to the paper by the feed in the upstream direction and $F_2$ is the load in the downstream direction, $F_1$ and $F_2$ being measured at the opposite ends of the feed; $F_1/F_2=e^{fa}$, where e is the base of natural logarithm (2.718), f is the coefficient of friction and a is the wrap angle on the major curve in radians, (See R. G. Hudson, The Engineers' Manual (equation 89). For $f=0.33$ and a 60° (1.047 radian) wrap angle, the differential force $F_1$-$F_2$ is 0.412. The belt-paper coupling provides 41% of the paper drive force. The wrap angle depends upon the amount of coupling ($F_1/F_2$) desired and the coefficient of friction. The coefficient of friction may normally vary over a range of from about 0.2 to 0.5 depending upon the material of the belt and its finish roughness. Smooth polyimide (Kapton) has a coefficent of about 0.22 while elastomerics (rubber) can have a coefficient of about 0.5. It will be seen from the following example that the mechanical, frictional coupling obtained by providing the wrap about the curved surface can be more than 40% greater than the natural coupling due to the frictional contact. In other words the mechanical coupling provided, in the illustrated elliptical path pin feed with a wrap angle of about 60°, is equivalent to that of six engaged pins, rather than merely four pins in the perforations 12 of the paper as shown. This is an important advantage, since it enables the feeding apparatus to be located in a small space and have a smaller form factor than possible with either pin wheel feeds or tractors. The close mechanical coupling also provides for efficient transfer of power and therefore reduces the load on the drive system (the mechanism which drives the sprocket). The close coupling eliminates or minimizes the need for a lid.

Figure 4:
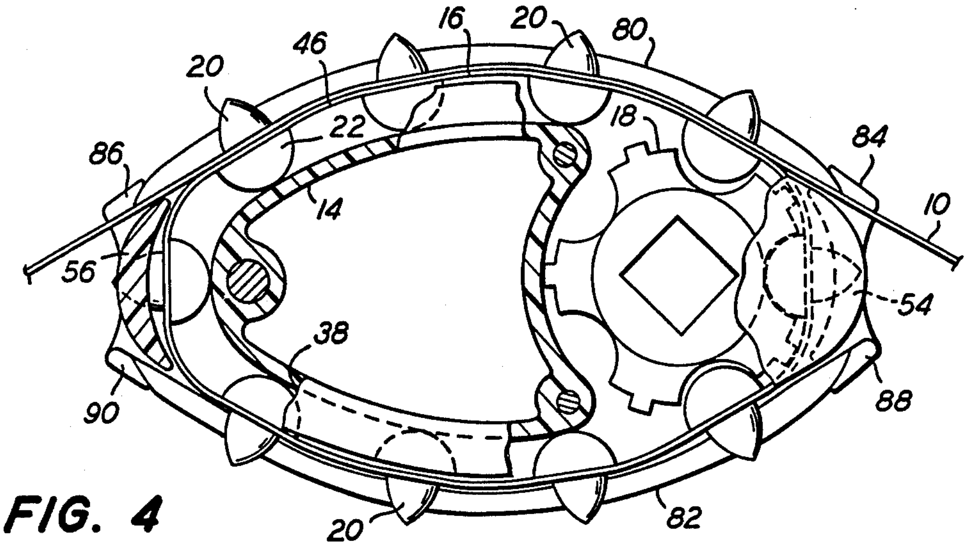
FIG. 4 is a front side view similar to FIG. 1 of perforated web feeding apparatus which is provided in accordance with another embodiment of the invention.
Figure 5:
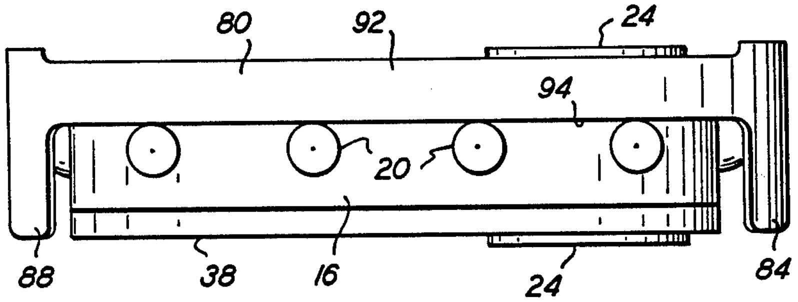
FIG. 5 is a plan view of the apparatus shown in FIG. 4.
Figure 6:
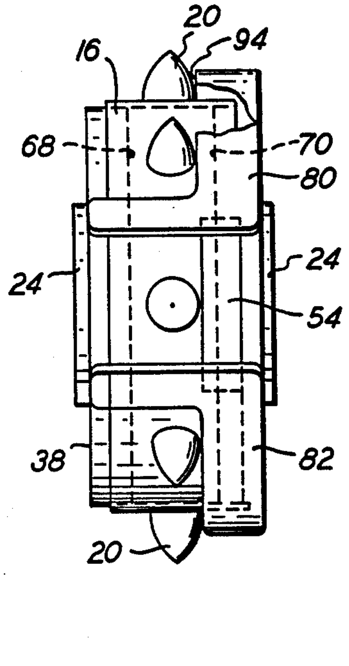
FIG. 6 is an end view of the apparatus shown in FIGS. 4 and 5 with one of the guide members broken away to illustrate the spacing thereof from the belt and other parts of the frame.

Referring to FIGS. 4, 5 and 6 there is shown an elliptical path pin feed similar to that shown in FIGS. 1, 2 and 3, and like parts are identified by like reference numerals. The feed shown in FIGS. 4, 5 and 6 is distinguished by lid arrangements 80 and 82 which extend over the major curved surfaces of the elliptical path and upstream and downstream beyond such surfaces to define guide members 84 and 86 in the case of the lid member 80, and 88 and 90 in the case of the lid member 82. Two lid members are used so that the feed may be used inverted or for feeding the paper 10 in opposite directions. The lid members 80 and 82 are attached to the outboard side plate 38 or the frame 14. They may, if desired be molded integrally with this side plate of the frame 14.

The guide members 84 and 86 in the case of the lid 80 are opposed to the guide shoes 54 and 56 and guide the paper along a path which is tangent to the major as well as the minor end surfaces at their common tangent points. This guidance of the paper provides for the wrap which affords for the close mechanical coupling discussed above in connection with FIGS. 1 through 3.

The lid 80 has a curved central portion 92 which extends laterally up to a surface 94 adjacent to the inside or inboard side of the pins 20. The guide members 84 and 86 extend entirely across the frame of 14 and cooperate, not only with the guide shoes 54 and 56, but also provide a means for straightening tents and other folds which may exist in the paper 10.

Figure 7:
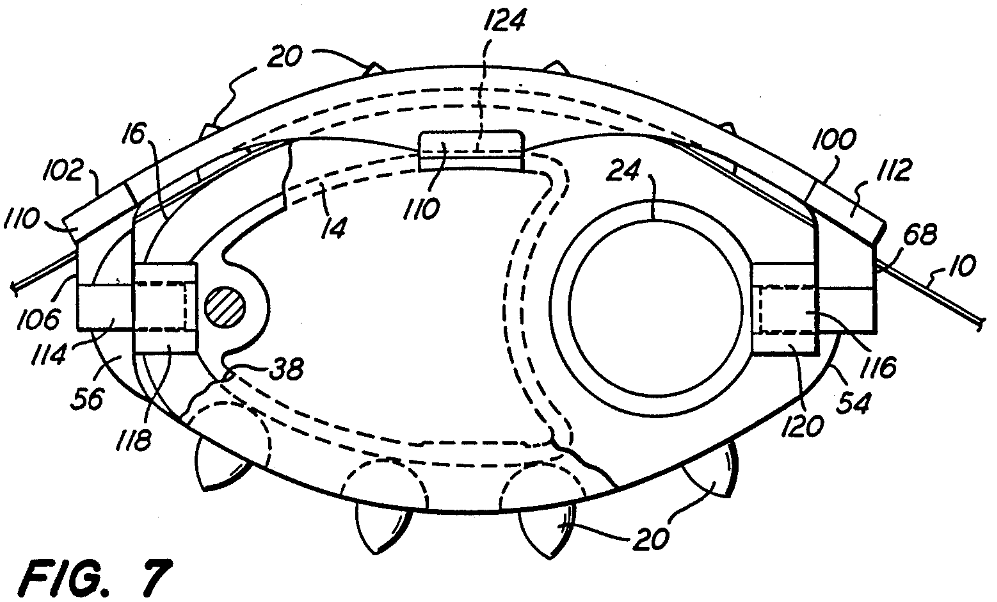
FIG. 7 is a opposite side view of perforated web feeding apparatus in accordance with another embodiment of the invention, the view being taken from the back of the apparatus.
Figure 8:
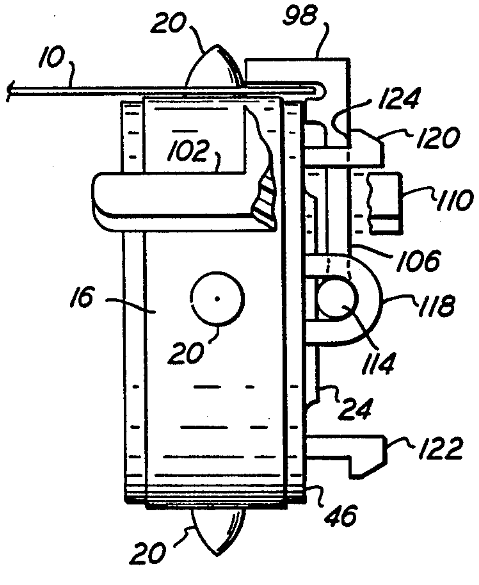
FIG. 8 is an end view of the apparatus shown in FIG. 7.

Referring to FIGS. 7 and 8, a lid structure similar to that shown in FIGS. 4, 5 and 6 is illustrated. The lid however is pivotal out of the way of the belt and may simplify the threading of the paper on the feed device. The lid includes a lid portion 98 having guide members 100 and 102 which project laterally and define the paper path which affords the wrap of the perforated paper 10 on the belt 16 along the major surface between the common tangent points, as described in connection with FIGS. 1-3. Legs 106 and 108 depend downwardly from rearward extensions 110 and 112 of the guide members 100 and 102. These legs have pins 114 and 116 extending in the direction toward each other. These pins are received in journals 118 and 119 formed on the inboard side plate 46 of the frame 14. The center portion of the lid 98 is flexible and springs outward when the legs 106 and 108 are spread apart. The lid springs inwardly when released to the position shown in the drawing. The lid 98 may be molded of glass filled polycarbonate material which has spring characteristics. In effect the lid 98 defines a wishbone which may be sprung outwardly so as to enable the pins 14 and 16 to clear and then enter the holes in the journals 116 and 118.

A detent latch 120 and another detent latch 122 (if the lid is mounted opposite the lower major curved surface of the feed) engages a step 124 along an inside edge of the lid 98 so as to maintain the lid in the position shown in FIGS. 7 and 8 of the drawings. To release the lid, the detent 120 is pressed downwardly and the lid 98 may be pivoted back away from the path of the paper 10 to allow the paper to be threaded on the belt 16 with the perforations thereof in the pins 20.

Figure 10:
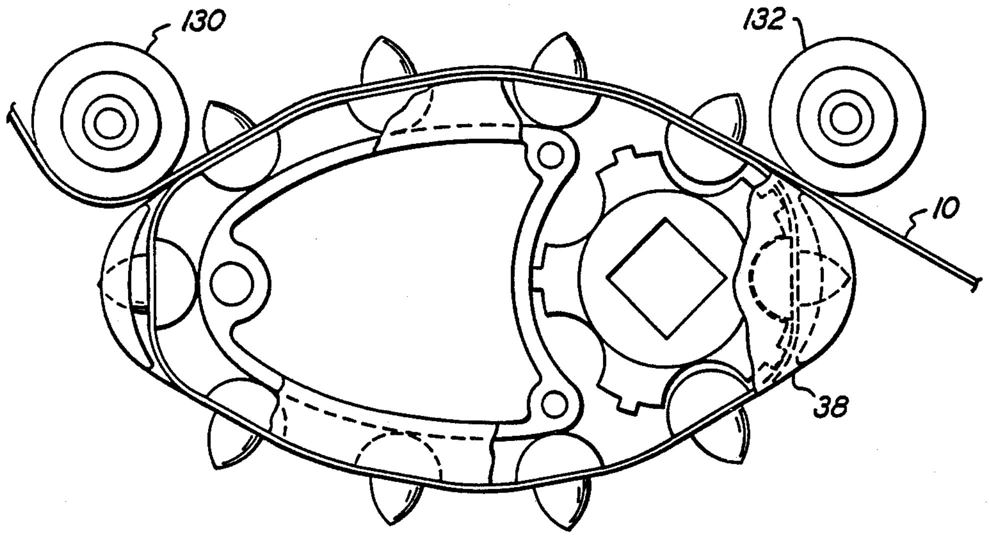
FIG. 10 is a front side view of apparatus for feeding perforated webs in accordance with still another embodiment of the invention; the view being similar to that shown in FIG. 4, but with the guide members provided by rollers.

Referring to FIG. 10 a feed mechanism similar to that described in connection with FIGS. 1 through 3 is shown. The guide member is provided by rollers 130 and 132 which guide the paper 10 along the path which is tangent to the major surface of the elliptical path and also to the end surfaces of the path at the common tangent point. The wrap of the paper on the belt is provided by the rollers. These rollers may be mounted on brackets attached to the inboard side plate 46 or separately on the frame of the printer with which the elliptical path pin feed apparatus is used and pivoted out of the way for loading the paper on the pin feed. The rollers may have indentations centrally thereof to clear the pins, when located over the center of the belt. Additional rollers over the major curved surface may be provided. The upstream roller 130 has the paper wrapped around it with an arc sufficient to predisplace the outer layers of a multi-layer web (a multipart computer form) to compensate for the displacement of such layers on the curved surface of the feed mechanism. It will be appreciated that the upstream guide members shown on the other embodiments herein can also be shaped to provide a curved surface for compensating for misalignment in multipart forms. Where the paper is only a single layer and even up to three or four layers, such predisplacement or compensation may be unnecessary. Reference may be had to the U.S. patent application of Leo S. Kerivan, Ser. No. 604,761, filed Apr. 27, 1984, now U.S. Pat. No. 4,616,773 issued Oct. 14, 1986 for a discussion of the displacement of the layers of multiple forms as they travel around the surface of a platen.

Referring to FIG. 9 and FIG. 9A there is shown an elliptical pin feed device wherein the sprocket 134 is mounted with its axis of rotation 136 at the mid-point of the major axis 34 of the elliptical path. At least two drive elements 22 of the belt 16 are in engagement with the recesses in the sprocket 134 so as to provide a smooth drive. The central location of the sprocket enables the use of a larger sprocket which provides a larger feed distance (e.g., four inches per revolution) than the sprocket located to one side of the center of the major axis as is the case with the devices illustrated in the preceding FIGS. of the drawing.

From the foregoing description, it will be apparent that there has been provided an improved apparatus for feeding perforated webs and particularly an improved elliptical path pin feed which has a form factor which is advantageous in the amount of space required for the feed as well as for providing close mechanical coupling between the web being fed and the drive belt. While several embodiments of the web feeding apparatus provided by the invention have been described, variations and modifications thereof within the scope of the invention will undoubtedly suggest themselves to those skilled in the art. For example, the feed device may be designated to have more or less than four pins in engagement with the perforations, for example, 3, 5, 6 or more pins. Accordingly, the foregoing description should be taken as illustrative and not in a limiting sense.

We claim:

1. Apparatus for feeding perforated webs having perforations spaced from each other, which apparatus comprises an endless belt having pins spaced from each other at a pitch equal to the spacing of said perforations and engageble with said web in said perforations, said belt also having drive elements, a frame defining an elliptical path for said belt with opposite major curved surfaces about major radii, along one of which major surfaces a number of said pins engage said perforations, a sprocket journaled in said frame and engageable with said drive elements, and guide members spaced upstream and downstream of at least said one curved surface and opposed to end surfaces of said frame adjacent minor curved surfaces defined by the minor radii of said elliptical path for engaging said web and maintaining it wrapped around at least the entire extent of said one curved surface and in contact with said belt along said one curved surface.

2. The apparatus according to claim 1 wherein said guide members are attached to said frame.

3. The apparatus according to claim 1 further comprising lid members having a curved surface corresponding to said one curved surface and spaced therefrom, said lid members having at the opposite ends thereof fingers which provides said guide members.

4. The apparatus according to claim 1 further comprising guide shoes at the end of said elliptical path having surfaces which are disposed with respect to said major curved surface along common tangents to said major and minor surfaces at the opposite ends of said major surface, said guide members and guide shoes being disposed on opposite sides of said web to define the path of said web entering and leaving said one major surface along said common tangents.

5. The apparatus according to claim 1 wherein said sprocket has its axis of rotation on one side of the center of said major axis of said elliptical path to define one of the end surfaces of said path.

6. The apparatus according to claim 5 wherein said frame has a laterally extending surface which supports said drive elements, said laterally extending surface having portions opposite to each other and end portions which define said major surfaces of said elliptical path and the end surface of said path opposite to said one end surface which is defined by said sprocket.

7. The apparatus according to claim 4 wherein said guide shoes are crescent in shape having outside surfaces which lie along said common tangent and inside surfaces, said inside surfaces being spaced from said elliptical path at the ends thereof to define a gap through which said belt passes.

8. The apparatus according to claim 4 wherein said guide shoes extend laterally, partially across said belt in noninterfering relationship with said belt and pins.

9. The apparatus according to claim 8 wherein said shoes are integral with said frame.

10. The apparatus according to claim 4 wherein said guide members have curved surfaces which are spaced opposite to said guide shoes to maintain said web path along said common tangents.

11. The apparatus according to claim 10 wherein said guide members are rollers spaced from the edges of said shoes a distance approximately equal to the thickness of the largest web to be handled.

12. The apparatus according to claim 1 wherein said sprocket has its rotational axis perpendicular to the major axis of said elliptical path and at the center of said major axis.

13. The apparatus according to claim 1 further comprising a lid including a curved member defining said guide members at the opposite ends thereof, the curve of said member being congruent to said one major surface, said lid having leg members extending from said curve member, said curved member being flexible to enable said legs to be bowed outwardly and to return inwardly toward each other, journal means on said legs and on said frame for receiving said leg journal means when said legs are bowed outwardly and then released.

14. The apparatus according to claim 13 wherein said journal means on said frame are openings and said journal means on said legs are pins receivable in said openings.

15. The apparatus according to claim 13 further comprising detent latch means on said frame for latching and releasibly positioning said curved member over said major curved surface.

16. The apparatus according to claim 1 wherein said guide members define a path for said web tangent to said major curved surface at the opposite ends thereof and having a wrap on said belt over said major curved surface which has a wrap angle at least one radian selected in accordance with the coefficient of friction between said web and said belt.

17. Apparatus for feeding perforated webs having perforations spaced from each other, which apparatus comprises an endless belt having a flat driving surface and having pins spaced from each other at a pitch corresponding to the spacing of said perforations and which enter into said perforations, said belt also having drive elements, a frame defining an arcuate path for said belt having a curved surface, along which surface a number of said pins enter said perforations, a sprocket journaled in said frame and engageable with said drive elements, and means for maintaining said web wrapped about said curved surface in contact with said flat driving surface of said belt over an arc sufficient to provide at least 40% of the coupling providing driving engagement between said web and said flat driving surface of said belt from the contact there-between over said arc.

18. Apparatus according to claim 17 wherein said arc is defined by $F_1/F_2=e^{fa}$ where $F_1$ is the driving force applied to said web in the direction of its movement, $F_2$ is the load applied to said web in a second direction opposite to said first direction, f is the coefficient of friction between said belt and web, and a is the angle of said arc in radians, and $F_1$-$F_2$ is at least 0.4.

19. The apparatus according to claim 17 wherein the angle of said arc is selected in accordance with said coefficient of friction.

20. A web feed mechanism having a frame and a web drive member having a web drive surface and being mounted in said frame and a lid over said web drive surface, characterized in that one of said frame and lid has journals and the other has pins by which said lid is pivotally mountable at the ends thereof on said frame, and said lid has a flexural portion in between the ends thereof which is bowable to displace said ends by at least the length of one of said pins- has been inserted to enable said ends to be brought together so as to mount them in said journals.

21. The mechanism according to claim 20 wherein said web drive surface is convexly curved and said flexural portion is curved so as to be congruent with said web drive surface.

22. The mechanism according to claim 21 whereas said ends are attached to said flexural portions by legs to define a wishbone shape for said lid.

23. The apparatus according to claim 15 wherein said detent means comprises a latch projecting away from said frame beyond the axis of said journal means and catch means on said curved member engagable with said latch and disengagable with said latch when said lid is pivoted downwardly and away from said frame.

24. The mechanism according to claim 20 wherein said journals define an axis about which said lid is pivotal, and including a detent including latch means on said frame and projecting away from said frame beyond said axis, and catch means on said flexural portion engagable with said latch means and disengagable with said latch means when said lid is pivoted downwardly and away from said frame.

25. An apparatus for feeding perforated webs having perforations spaced from each other, said apparatus having an endless belt, a sprocket driving said belt, and said belt having pins spaced from each other so as to enter into said perforations, the improvement comprising a frame having a curved surface defining an arcuate path for said belt and said web along which path said pins enter said perforations, means for maintaining said web wrapped around said path in contact with said belt over an arc of wrap of at least one radian to provide frictional coupling between said belt and said web thereby reducing the load on said pins.

26. The improvement according to claim 25 wherein said curved surface is elliptical in shape.

27. The improvement according to claim 25 wherein said arc of wrap is about 60°.

28. The improvement according to claim 25 wherein said arc of wrap is a function of the coefficient of friction of said belt and web with respect to each other.

29. The improvement according to claim 25 wherein said maintaining means comprises a web guide member spaced from said path.

30. The improvement according to claim 29 wherein said web is a multi-layer web and said web guide member has a curved surface around which said web executes an arc sufficient to predisplace said layers to compensate for the displacement thereof while moving along said path over said arc.

* * * * *